July 24, 1934. H. C. DRAKE 1,967,812
FLAW DETECTOR MECHANISM FOR ELECTRICAL CONDUCTORS
Filed Feb. 24, 1933
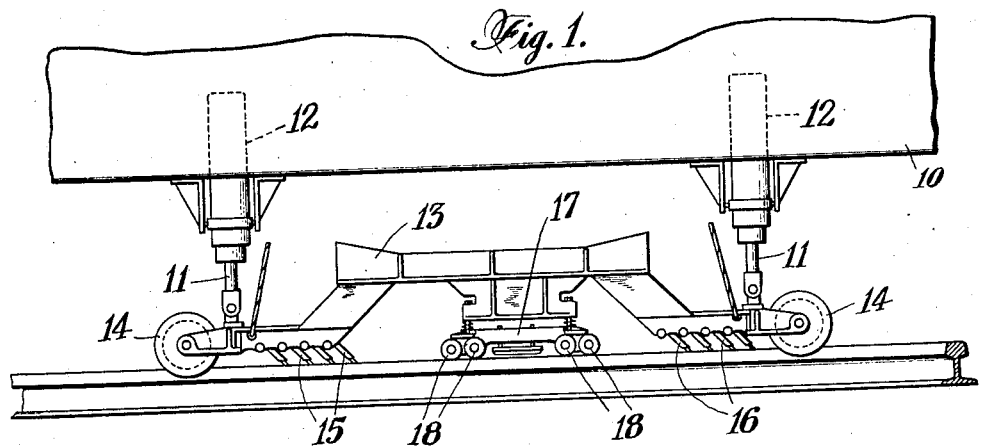
Fig. 1.
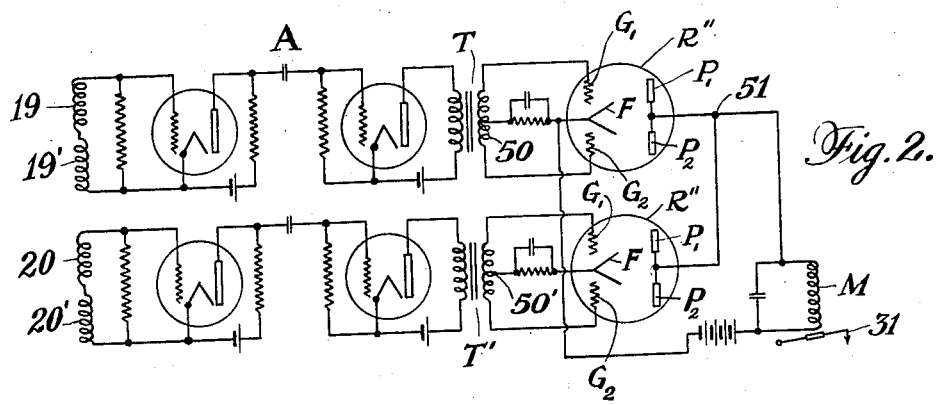
Fig. 2.
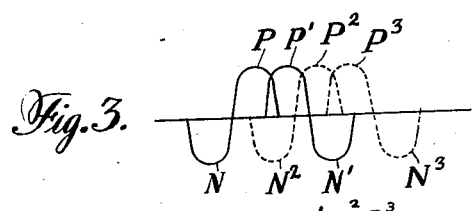
Fig. 3.
Fig. 4.
Fig. 5.
Fig. 6.
Fig. 7.
Fig. 8.
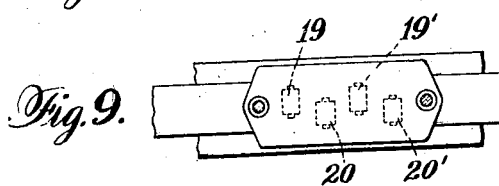
Fig. 9.
Inventor
Harcourt C. Drake
Joseph H. Lipschutz
Attorney Patented July 24, 1934

1,967,812

UNITED STATES PATENT OFFICE 1,967,812

FLAW DETECTOR MECHANISM FOR ELECTRICAL CONDUCTORS

Harcourt C. Drake, Hempstead, N. Y., assignor to Sperry Products, Inc., Brooklyn, N. Y., a corporation of New York Application February 24, 1933, Serial No. 658,359

5 Claims. (Cl. 175—183)

This invention relates to flaw detector mechanism and particularly to the type of rail flaw detector mechanism utilized in the Sperry detector cars. As is now well known, the Sperry detector car operates on the principle of sending a heavy current through an electrical conductor, in this case a rail, and causing a pair of opposed induction coils to travel through the electromagnetic field thus established so that when a flaw is encountered a differential E. M. F. is generated, and said differential E. M. F. is then amplified by a thermionic amplifier to cause operation of an indicator.

In my copending application Serial No. 542,531 filed June 6, 1931 I disclose a modified form of detector unit in which two pairs of opposed coils are employed instead of one, said pairs being staggered so as to cooperate with the respective sides of the rail head. The sets of coils were so arranged that the output of the second pair was designed to overlap and reinforce the output of the first pair of coils when a flaw was encountered. It will be understood that as each coil passes through a region of flaw there is generated a positive type impulse and a negative type impulse so that each pair generates two positive impulses and two negative impulses and when several pairs of coils are used this number is multiplied by the number of pairs of coils. Where several pairs of coils were employed in overlapping relation it was found that the negative impulses due to one pair overlapped the positive impulses due to another pair of coils and tended to neutralize each other to a greater or lesser extent so that the total useful output was thus diminished. By my copending application Serial No. 585,662, filed January 9, 1932, I disclosed a system wherein the output of each pair of coils was rectified so that only impulses of one type came through while the impulses of the other type were eliminated. This prevented the neutralizing effect just described and produced a larger useful output.

The object of the present invention is to provide a system which can be employed either with one pair of coils or several pairs of coils and will in each case produce a larger useful output than was heretofore obtained by the methods previously employed and hence permits internal flaws to be more readily detected.

Further objects of my invention will become apparent in the following detailed description thereof.

In the accompanying drawing,

Fig. 1 is a side elevation of a portion of a Sperry detector car showing a rail detector mechanism suspended therefrom in operative position in engagement with a rail.

Fig. 2 is a wiring diagram embodying my invention.

Figs. 3, 4 and 5 are graphs illustrating the theory underlying my invention.

Figs. 6, 7 and 8 are oscillographs of the output of an amplifier illustrating the results accomplished by my invention relative to the results heretofore obtained.

Fig. 9 is a plan view of the detector unit employed in the Fig. 1 form of the detector mechanism.

Referring to Fig. 1 of the drawing, there is illustrated the usual structure of the Sperry rail flaw detector mechanism. This mechanism is suspended from beneath a car body 10 by means of piston rods 11 extending out of fluid pressure cylinders 12, the said piston rods supporting a current brush carriage 13 which rides on the rails, in lowered or operative position, on wheels 14. Said current brush carriage is provided with inlet and outlet current brushes 15, 16 adapted to conduct current supplied by a generator (not shown) within the car body into and out of the rail. Supported on said current brush carriage for independent movement is the detector carriage 17 which rides on the rail on rollers 18 and supports the detector coils 19, 19' and 20, 20' (see Fig. 9).

By reference to Figs. 2 and 9 it will be seen that these coils, comprising two pairs, each pair connected in opposition, are arranged in staggered relation as described in my copending application Serial No. 542,531. It will be seen that the pair 19, 19' coacts principally with one side of the rail head while the pair 20, 20' coacts principally with the other side. The advantages of such an arrangement are fully described in my copending application. Also, the coils of pair 20, 20' alternate with the respective coils of pair 19, 19' in order that the useful output of the second pair may come in at a point where it will reinforce the output of the first pair.

By referring to Fig. 3 it will be seen that when a flaw is encountered coil 19 will be the first to enter the changing field caused by such flaw and will be the first to leave it. Thus, there will be generated, for example, a negative impulse N and a positive impulse P. The coil 19' on entering the region of the flaw will generate a positive impulse $P^1$ and then a negative impulse $N^1$ because said coil 19' is oppositely wound to that of coil 19. The coil 20 will generate a negative impulse $N^2$ and the positive impulse $P^2$, while coil 20' will generate a positive impulse P³ and a negative impulse N³. The coils of each pair are so arranged that the positive impulses such as P, P¹ overlap so as to make a fairly continuous output of that pair of coils, as disclosed in my copending application Serial No. 583,854 filed December 30, 1931. The arrangement of the two pairs of coils relative to each other as shown in Fig. 9 is for the purpose of causing positive impulses P², P³ caused by the set of coils 20, 20' to be substantially additive to that of P, P¹. Thus, it will be seen that the four positive impulses P, P¹, P², P³ are substantially continuous.

In the arrangement of coils heretofore described it will be seen by reference to the graph of Fig. 3 that certain negative impulses such as N² N¹ counterbalance and, in fact, tend to wipe out part of the corresponding positive impulses P, P¹, P², P³. Thus the resultant useful and positive (in this case) output which goes into the amplifier is substantially reduced and therefore the maximum useful output is not obtained. Heretofore, by my invention disclosed in my copending application Serial No. 585,662 I provided means whereby the counteracting effect of the negative impulses was eliminated. I did this by providing a rectifier system which permitted only impulses of one type, in this case the positive impulses, to pass through while cutting off the impulses of the other type. A distinctly improved output from the amplifier was thereupon obtained. The relative outputs between the unrectified system and the rectified system shown in my said copending application being illustrated by the oscillographs of Figs. 6 and 7 showing actual outputs with the two systems. The portion of the oscillograph above the line and which represents the useful output is of substantially greater extent in the Fig. 7 oscillograph illustrating the use of my rectifying system than in the Fig. 6 oscillograph illustrating the old arrangement.

By my present invention I carry this development a step further. While in the form of invention disclosed in my said copending application No. 585,662 I have been content with rectification that substantially wiped out the impulses of a different sign (as, for instance, all of the negative impulses while retaining the positive impulses), in the form of my invention herein disclosed I actually reverse the sign of one set of impulses so that they are added to the impulses originally of that sign. Thus, by reference to the graph of Fig. 5, it will be seen that by my present invention the impulses N, N¹, N², N³ instead of being wiped out are reversed in direction and their effect is added to that of the impulses P, P¹, P², P³.

I am enabled to perform the function described above by employing the principle of full-wave rectification. This may be accomplished by employing full-wave rectifying tubes R″ as shown in Fig. 2, each of which comprises two grids G₁, G₂, a common filament F, and two plates P₁, P₂. The amplifier A into which the output of coils 19, 19', 20, 20' operates may be resistance-coupled up to the full-wave rectifying tubes, but the input to these tubes is transformer-coupled by means of transformers T, T' with a central connection 50, 50' to the input secondary of each transformer. As an impulse is delivered to the secondary of each transformer, the impulse in one direction, for example, the positive impulse, may pass through the rectifier R″ by way of grid G₁ and Plate P₁, while the other impulse, for instance the negative impulse, may not pass through the grid G₁ but may pass through the grid G₂. The central connection 50, 50' to each transformer serves to reverse the direction of the input to the grid G₂ and thus the outputs from plates P₁, P₂ are both in the same direction, although the inputs were opposite in sign. Thus, I obtain an output from the coils as shown in Fig. 5. The two full-wave tubes are provided so that each pair of coils 19, 19' and 20, 20' may pass through its own full-wave rectifier and the outputs from said full-wave tubes may be joined at 51 so that the common output may operate an indicator such as a recorder comprising a pen 31 connected by a relay M energized from the output of the rectifier tubes.

The effect of turning up the impulses of the opposite sign by full-wave rectification is to cause all the impulses to be additive and the result is shown in the comparative oscillograph of Fig. 8 which demonstrates that a much larger useful output is obtained than in the forms of my invention heretofore employed and represented by the oscillographs of Figs. 6 and 7.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In a flaw detector mechanism for electrical conductors, means for establishing an electromagnetic field around the conductor, a plurality of pairs of detector coils adapted to be moved over said conductor whereby each coil generates a positive type impulse and a negative type impulse on passing through a region of flaw, said coils being so positioned relative to each other that certain of said impulses of one type tend to counteract certain of said impulses of the other type, a full wave rectifying circuit for converting the impulses of one of said types into the other of said types whereby the output of said circuit is all of one type, and an indicator adapted to be actuated by said impulses.

2. In a flaw detector mechanism for electrical conductors, means for establishing an electromagnetic field around the conductor, a plurality of pairs of detector coils adapted to be moved over said conductor whereby each coil generates a positive type impulse and a negative type impulse on passing through a region of flaw, said coils being so positioned relative to each other that certain of said impulses of one type tend to counteract certain of said impulses of the other type, a full wave rectifying circuit for converting the impulses of one of said types into the other of said types whereby the output of said circuit is all of one type, said circuit including a full wave rectifier and means for reversing the input of one of said types into the rectifier, and an indicator adapted to be actuated by the output of said circuit.

3. In a flaw detector mechanism for electrical conductors, means for establishing an electromagnetic field around the conductor, a plurality of pairs of detector coils adapted to be moved over said conductor whereby each coil generates a positive type impulse and a negative type impulse on passing through a region of flaw, said coils being so positioned relative to each other that certain of said impulses of one type tend to counteract certain of said impulses of the other type, a full wave rectifying circuit for converting the impulses of one of said types into the other of said types whereby the output of said circuit is all of one type, said circuit including a full wave rectifier and an input transformer having a split secondary coil for reversing the input of one of said types into the rectifier, and an indicator adapted to be actuated by the output of said circuit.

4. In a flaw detector mechanism for electrical conductors, means for establishing an electromagnetic field around the conductor, a plurality of pairs of detector coils adapted to be moved over said conductor whereby each coil generates a positive type impulse and a negative type impulse on passing through a region of flaw, said coils being so positioned relative to each other that certain of said impulses of one type tend to counteract certain of said impulses of the other type, a full wave rectifying circuit for each pair of coils for converting the impulses of one of said types into the other of said types whereby the output of said circuits is all of one type, each of said circuits including a full wave rectifier and means for reversing the input of one of said types into the rectifier, and an indicator adapted to be actuated by the output of said circuits.

5. In a flaw detector mechanism for electrical conductors, means for establishing an electromagnetic field around the conductor, a plurality of pairs of detector coils adapted to be moved over said conductor whereby each coil generates a positive type impulse and a negative type impulse on passing through a region of flaw, said coils being so positioned relative to each other that certain of said impulses of one type tend to counteract certain of said impulses of the other type, a full wave rectifying circuit for each pair of coils for converting the impulses of one of said types into the other of said types whereby the output of said circuits is all of one type, each of said circuits including a full wave rectifier and an input transformer having a split secondary coil for reversing the input of one of said types into the rectifier, and an indicator adapted to be actuated by the output of said circuits.

HARCOURT C. DRAKE.